United States Patent
Yuba et al.

(10) Patent No.: US 7,786,857 B2
(45) Date of Patent: Aug. 31, 2010

(54) PATH TRACKING SYSTEM, TERMINAL DEVICE, FIXED COMMUNICATION DEVICE, AND PATH MANAGEMENT DEVICE

(75) Inventors: Takashi Yuba, Shinagawa (JP); Shigemi Kurashima, Shinagawa (JP); Masahiro Yanagi, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 562 days.

(21) Appl. No.: 11/882,333

(22) Filed: Jul. 31, 2007

(65) Prior Publication Data
US 2008/0204224 A1    Aug. 28, 2008

(30) Foreign Application Priority Data
Feb. 28, 2007   (JP)   ............................ 2007-049505

(51) Int. Cl.
G08B 1/08   (2006.01)
(52) U.S. Cl. ............... 340/539.13; 340/5.91; 340/573.1; 705/10
(58) Field of Classification Search ............... 340/573.1, 340/539.11, 539.13, 505, 10.1, 10.6, 5.91, 340/825.49, 572.1, 572.4; 348/143, 169; 705/10, 14
See application file for complete search history.

(56) References Cited

U.S. PATENT DOCUMENTS

| | | | | |
|---|---|---|---|---|
| 4,973,952 A * | 11/1990 | Malec et al. | ............... | 340/5.91 |
| 5,264,822 A * | 11/1993 | Vogelman et al. | .......... | 340/5.91 |
| 5,646,616 A * | 7/1997 | Komatsu | .................... | 340/5.91 |
| 6,456,234 B1 * | 9/2002 | Johnson | .................. | 342/357.09 |
| 6,507,279 B2 * | 1/2003 | Loof | ............................. | 705/10 |
| 2001/0028301 A1 * | 10/2001 | Geiger et al. | .............. | 340/5.91 |
| 2005/0258975 A1 | 11/2005 | Hunt | | |
| 2006/0145838 A1 * | 7/2006 | Alvarez et al. | ......... | 340/539.13 |
| 2007/0008068 A1 * | 1/2007 | Brice et al. | ................ | 340/5.91 |

FOREIGN PATENT DOCUMENTS

JP   2005-534093   11/2005

* cited by examiner

*Primary Examiner*—Thomas J Mullen
(74) *Attorney, Agent, or Firm*—Staas & Halsey LLP

(57) ABSTRACT

A shopping path tracking system is disclosed that comprises a terminal device, a fixed communication device, and a path management device. The fixed communication device wirelessly communicates with the terminal device, calculates a response time of the terminal device, and reports the calculated response time to the path management device. The path management device detects a position of the terminal device based on the response time reported from the fixed communication device, stores the detected position, and detects a travel path of the terminal device by tracking the stored positions.

17 Claims, 18 Drawing Sheets

FIG.10

| ID INFORMATION | TIME/DATE | POSITION | STOP TIME n | WEATHER |
|---|---|---|---|---|
| ID1 | t11 | p11 | T11 | FINE |
|  | t21 | p11 | .. |  |
|  | .. | .. | — |  |
|  | t1n | p1n | — |  |
| ID2 | t21 | p21 | .. |  |
|  | .. | .. | — |  |
|  | t2m | p2m | .. |  |
| .. | .. | .. | .. | .. |

FIG.13

| POSITION INFORMATION | INFORMATION TO BE PROVIDED |
|---|---|
| p1 | D1 |
|  |  |
| pj | Dj |

FIG.14
(A)
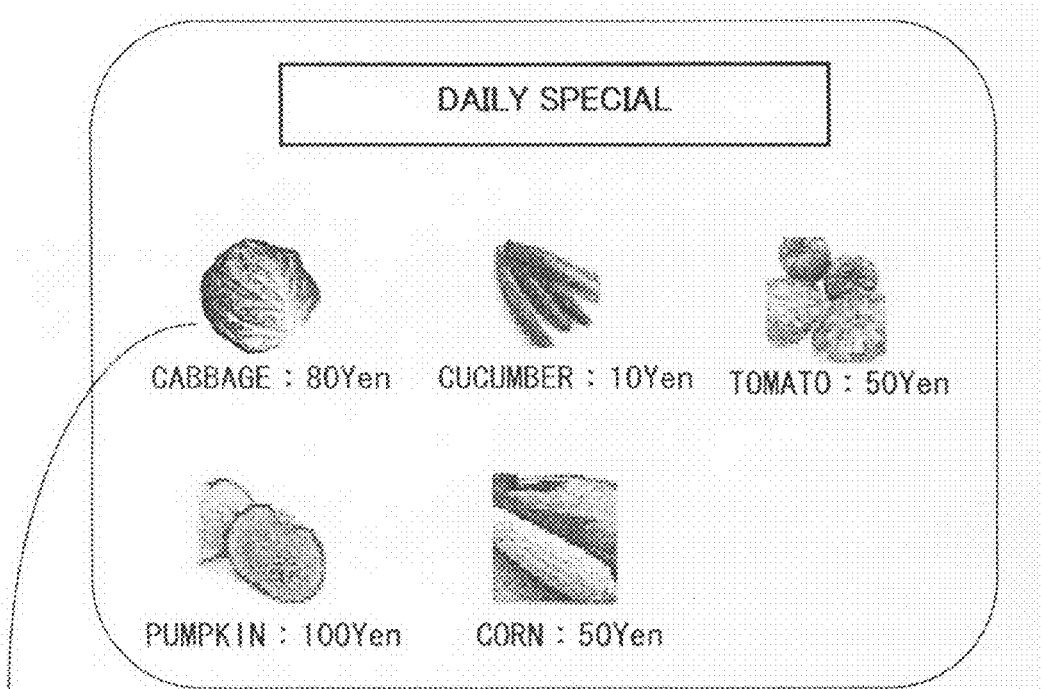
CLICK
TOUCH
PANEL
(B)
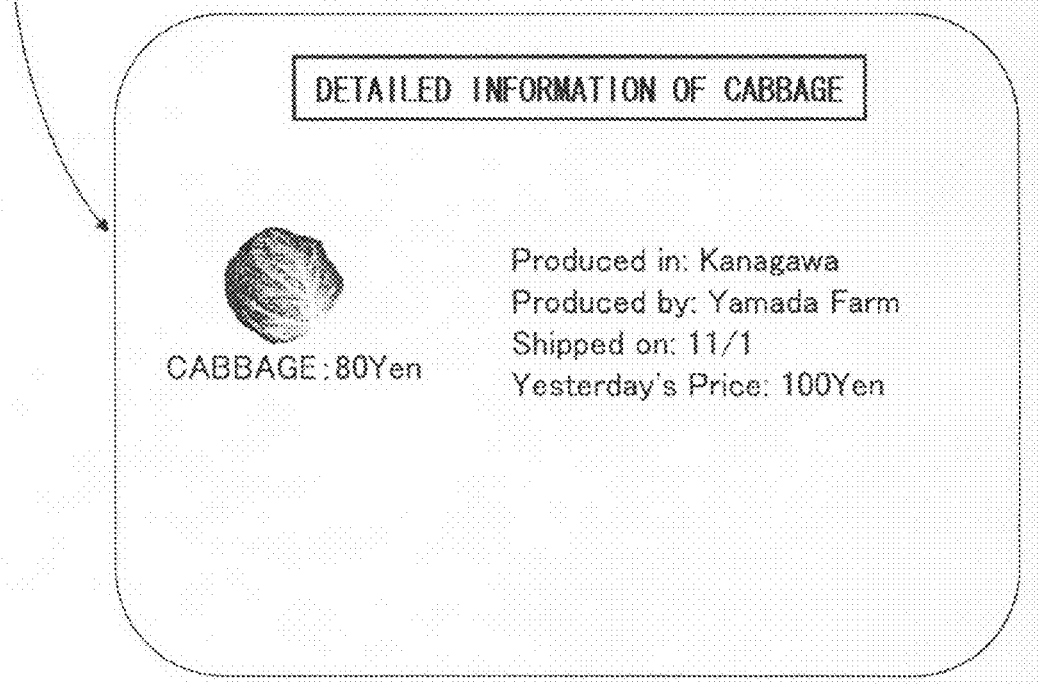

PATH TRACKING SYSTEM, TERMINAL DEVICE, FIXED COMMUNICATION DEVICE, AND PATH MANAGEMENT DEVICE

BACKGROUND OF THE INVENTION

1. Field of the Invention

The present invention generally relates to a path tracking system, a terminal device, a fixed communication device, and a path management device, and particularly relates to a path tracking system that detects a path of a shopper in a shopping center or the like, a terminal device, a fixed communication device, and a path management device.

2. Description of the Related Art

In recent years there has been a demand for identifying a shopper path of a shopper through a shopping center or the like in order to analyze buying patterns and thereby to properly lay out products in a manner that encourages shoppers to buy them, or thereby to prevent entry into forbidden areas in a shop.

Japanese Patent Application Publication No. 2005-534083 discloses a system that prevents entry into forbidden areas in a shop. This system comprises a cart fitted with a wireless receiver and a wireless transmitter located at a forbidden area in a shop such that the cart generates an alarm when the cart enters a forbidden area.

However, such a system of preventing entry into forbidden areas in a shop is configured such that a cart fitted with a wireless receiver generates an alarm in response to a signal from a wireless transmitter located at a forbidden area, and is not capable of detecting a path of the cart.

SUMMARY OF THE INVENTION

In view of the foregoing, the present invention provides a path tracking system that detects and tracks the position of a terminal device and thereby detects a path of the terminal device; a terminal device; a fixed communication device; and a path management system.

According to an aspect of the present invention, there is provided a shopping path tracking system that comprises a terminal device, a fixed communication device, and a path management device. The fixed communication device wirelessly communicates with the terminal device, calculates a response time of the terminal device, and reports the calculated response time to the path management device. The path management device detects a position of the terminal device based on the response time reported from the fixed communication device, detects a travel path of the terminal device by tracking the detected position, and stores the travel path.

It is preferable that the path management device calculate time during which the terminal device is stopped. It is also preferable that the path management device send an alarm to a security device depending on the position and the travel path of the terminal device. It is also preferable that the path management device send to the terminal device an information item corresponding to the position and the travel path of the terminal device based on the position and the travel path of the terminal device, and the terminal device display the information item on a display unit. It is also preferable that the terminal device communicate with the fixed communication device using Ultra Wideband communications.

According to another aspect of the present invention, there is provided a terminal device that wirelessly communicates with a fixed communication device and communicates with a path management device via the fixed communication device. The terminal device comprises a communication unit, a display unit, and a processing unit. In response to a response request from the fixed communication device, the processing unit causes the communication unit to send a response to the fixed communication device. The display unit displays an information item corresponding to a position from which the response is sent by the communication unit, the information item being sent from the path management device via the fixed communication device. It is preferable that the communication unit communicate with the fixed communication device using Ultra Wideband communications.

According to still another aspect of the present invention, there is provided a fixed communication device that communicates with a terminal device and a path management device. The fixed communication device comprises a wireless communication unit that wirelessly communicates with the terminal device, a communication unit that communicates with the path management device, and a processing unit that causes the wireless communication unit to communicate with the terminal device, detects a response time from transmission of a response request to reception of a response from the terminal device, causes the communication unit to report the response time to the path management device, and sends to the terminal device an information item provided by the path management device based on the response time. It is preferable that the wireless communication unit communicate with the terminal device using Ultra Wideband communications.

According to a further aspect of the present invention, there is provided a path management device that communicates with a terminal device via a fixed communication device. The path management device comprises a communication unit that communicates with the fixed communication device, a storage unit, a processing unit that detects a position of the terminal device based on a response time of the terminal device reported from the fixed communication device, sends to the terminal device via the fixed communication device an information item corresponding to the position of the terminal device, detects a travel path and a stop position of the terminal device based on plural of the positions of the terminal device, and stores the travel path and the stop position into the storage unit.

In one embodiment of the present invention a fixed communication device wirelessly communicates with a terminal device, calculates a response time of the terminal device, and reports the calculated response time to a path management device. The path management device detects the position of the terminal device based on the response time reported from the fixed communication device, detects a travel path of the terminal device by tracking the detected position, and stores the travel path.

BRIEF DESCRIPTION OF THE DRAWINGS

FIG. 10 is a diagram illustrating a data structure of a position information storage area in a storage unit;

FIG. 13 is a diagram illustrating a data structure of an information provision database;

FIG. 14 shows an example of an information display screen displayed on a display unit;

DETAILED DESCRIPTION OF THE PREFERRED EMBODIMENT

First Embodiment

Figure 1:
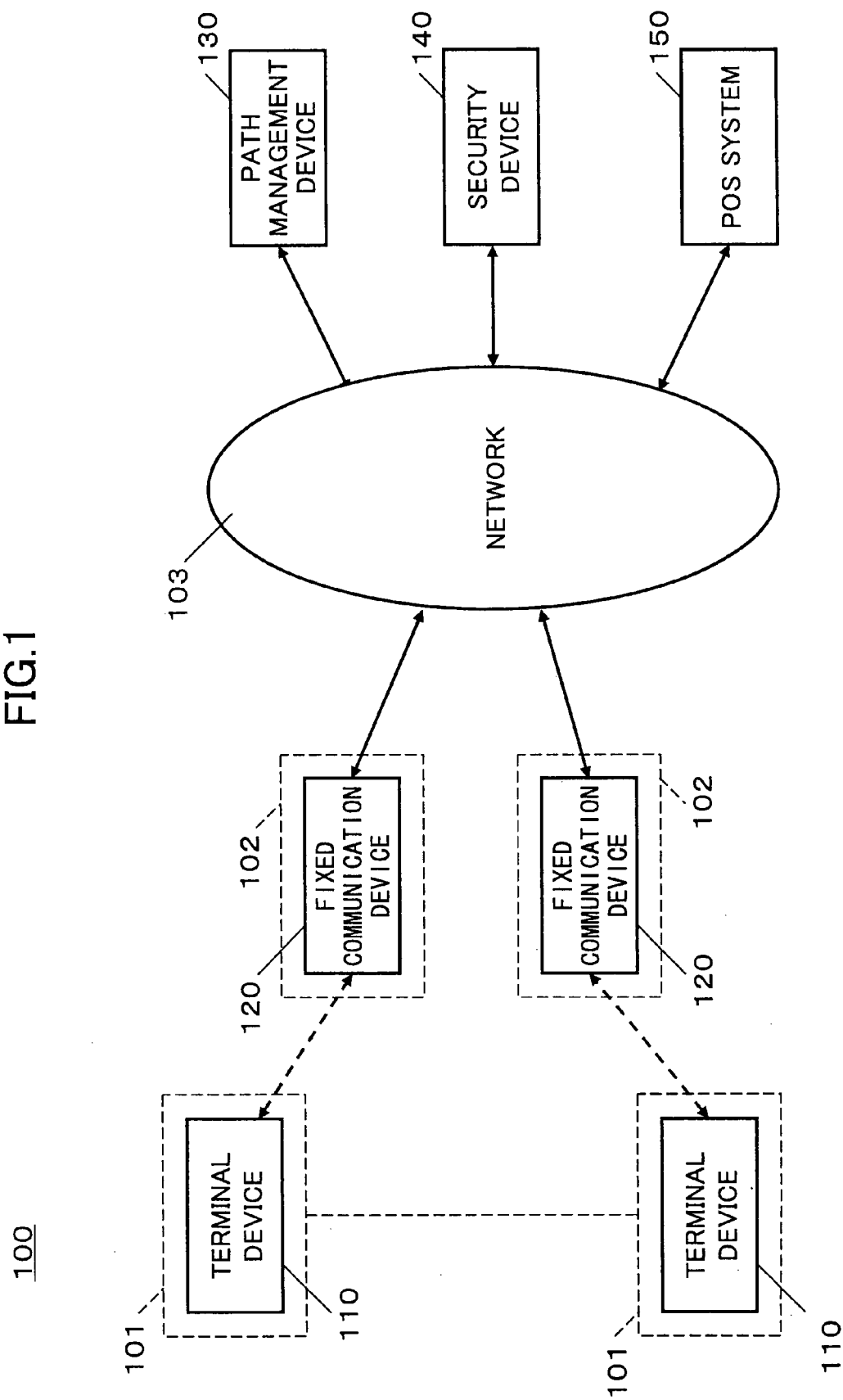
FIG. 1 is a system configuration diagram according to a first embodiment of the present invention.

FIG. 1 is a system configuration diagram according to a first embodiment of the present invention.

A shopping path tracking system 100 of this embodiment is configured to record a shopper path of a shopper through a shopping center or the like, and comprises terminal devices 110, fixed communication devices 120, a path management device 130, a security device 140, and a POS (Point of Sale) system 150.

The terminal devices 110 can communicate with the fixed communication devices 120 using UWB (Ultra-Wideband) communications. The fixed communication devices 120 can communicate with the path management device 130 via a network 103 such as a LAN.

The fixed communication devices 120 are disposed at regular intervals in a shop. The fixed communication device 120 requests the terminal device 110 to send a response. The terminal device 110 sends a response in response to the response request from the fixed communication device 120. The fixed communication device 120 measures the response time of the terminal device 110 and reports it to the path management device 130.

The path management device 130 has positional (coordinate) information of each fixed communication device 120. The path management device 130 detects the position of the terminal device 110 based on the response time reported from a plurality of the fixed communication devices 120, detects the travel path of the terminal device 110 by tracking the detected position, and records the position and the travel path of the terminal device 110.

The path management device 130 calculates the time during which the terminal device 110 is stopped so as to detect the travel behavior of the terminal device 110. The path management device 130 issues an alarm to the security device 140 depending on the position and the travel path of the terminal device 110. The path management device 130 sends information corresponding to the position and the travel path of the terminal device 110 to the terminal device 110 based on the position and the travel path of the terminal device 110. The terminal device 110 displays the information sent from the path management device 130 on a display unit 134 (described below). The path management device 130 stores the travel path and a stop position of the terminal device 110 in a manner associated with products arranged along the travel path and in the stop position, thereby building a database.

The configuration of a cart 101 is described below.

Figure 2:
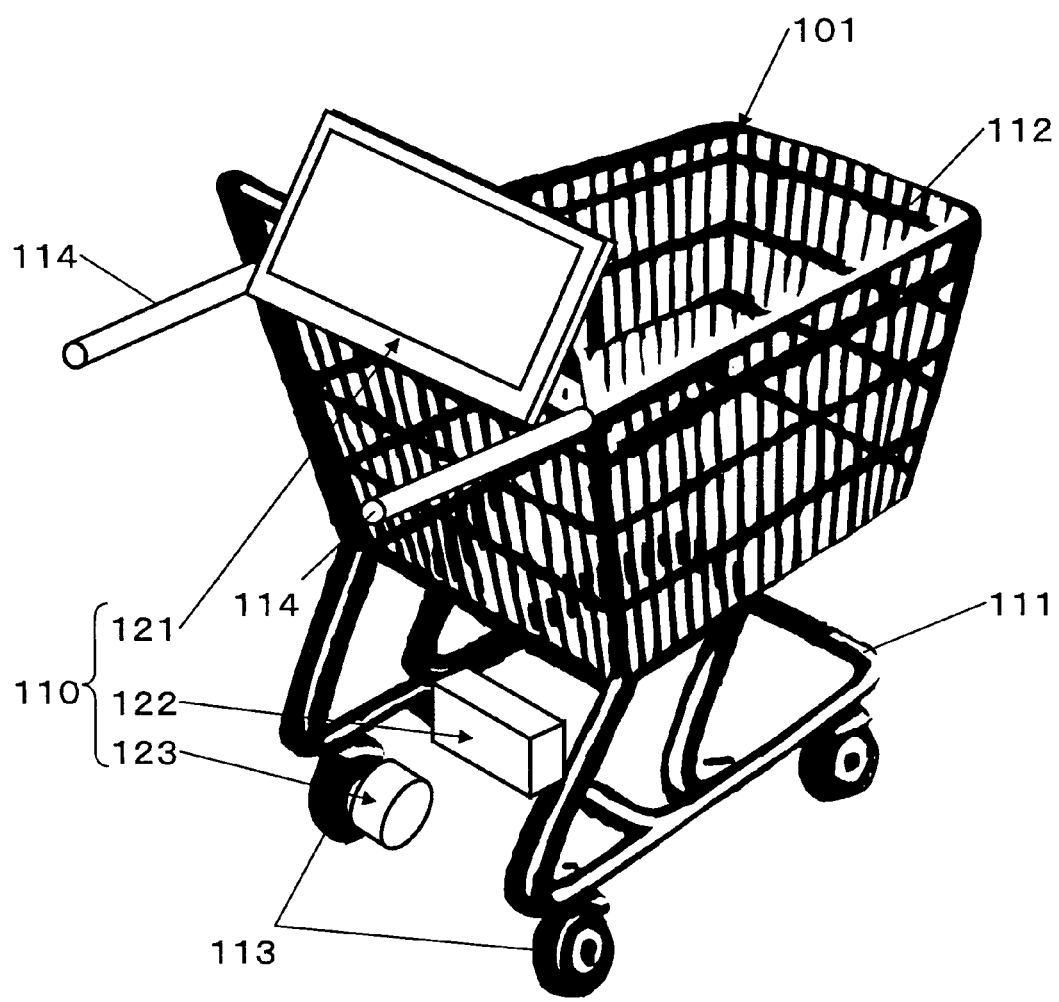
FIG. 2 is a perspective view illustrating a cart.
Figure 3:
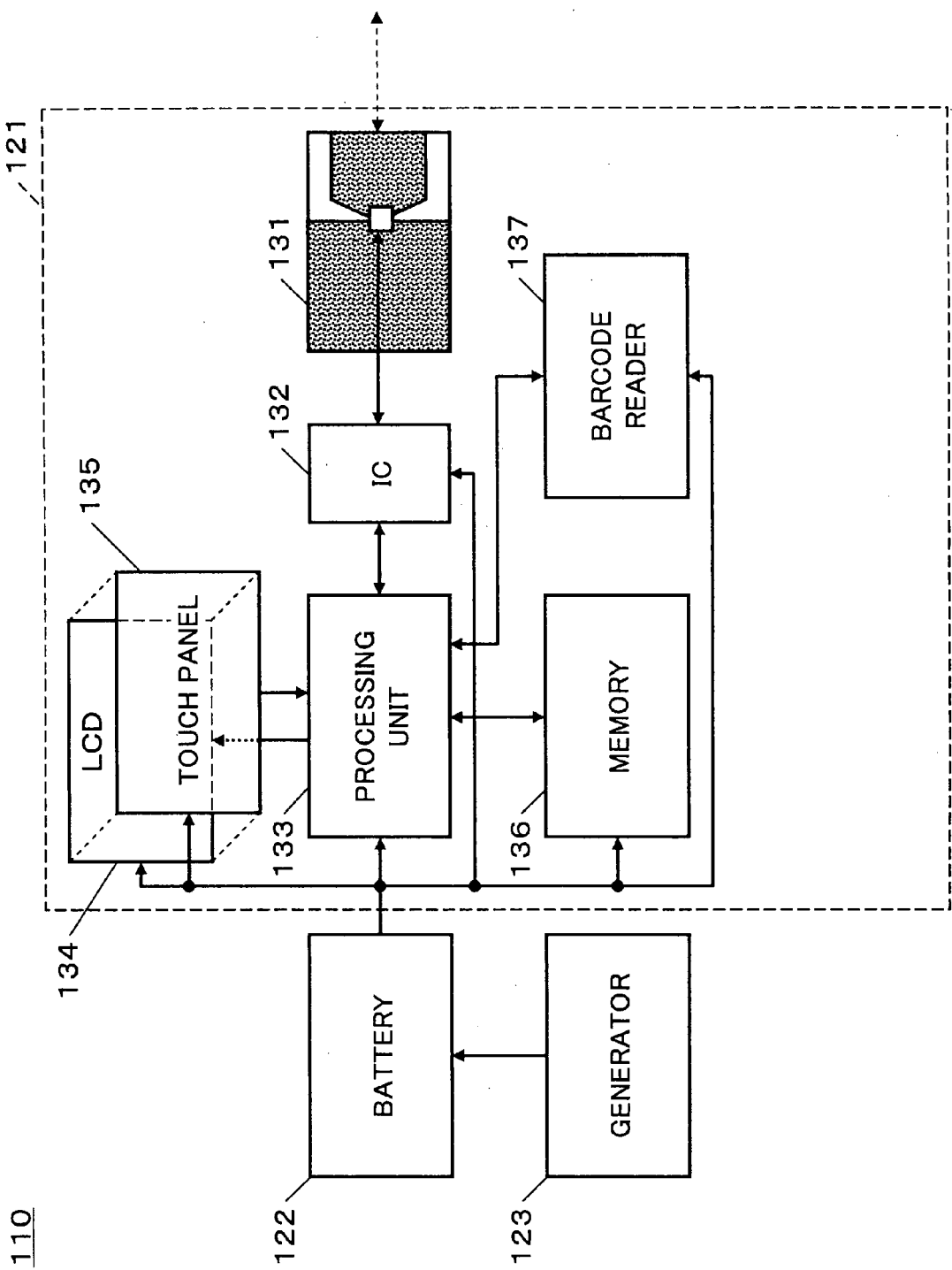
FIG. 3 is a block diagram illustrating a configuration of a terminal device.

FIG. 2 is a perspective view illustrating the cart 101, and FIG. 3 is a block diagram illustrating a configuration of the terminal device 110.

The terminal device 110 is attached to the cart 101 so as to travel with a shopper.

The cart 101 comprises a base 111, a basket 112, wheels 113, and handles 114. The cart 101 is fitted with the terminal device 110.

The terminal device 110 comprises a device main body 121, a battery 122, and a generator 123. The terminal device 110 is configured to respond to a response request from the fixed communication device 120, receive from the fixed communication device 120 the information corresponding to the position and the travel path of the terminal device 110, and display the received information on the display unit 134. The device main body 121 comprises a UWB antenna unit 131, a UWB communication IC chip 132, a processing unit 133, the display unit 134, a touch panel 135, a memory 136, and a barcode reader 137.

Figure 4:
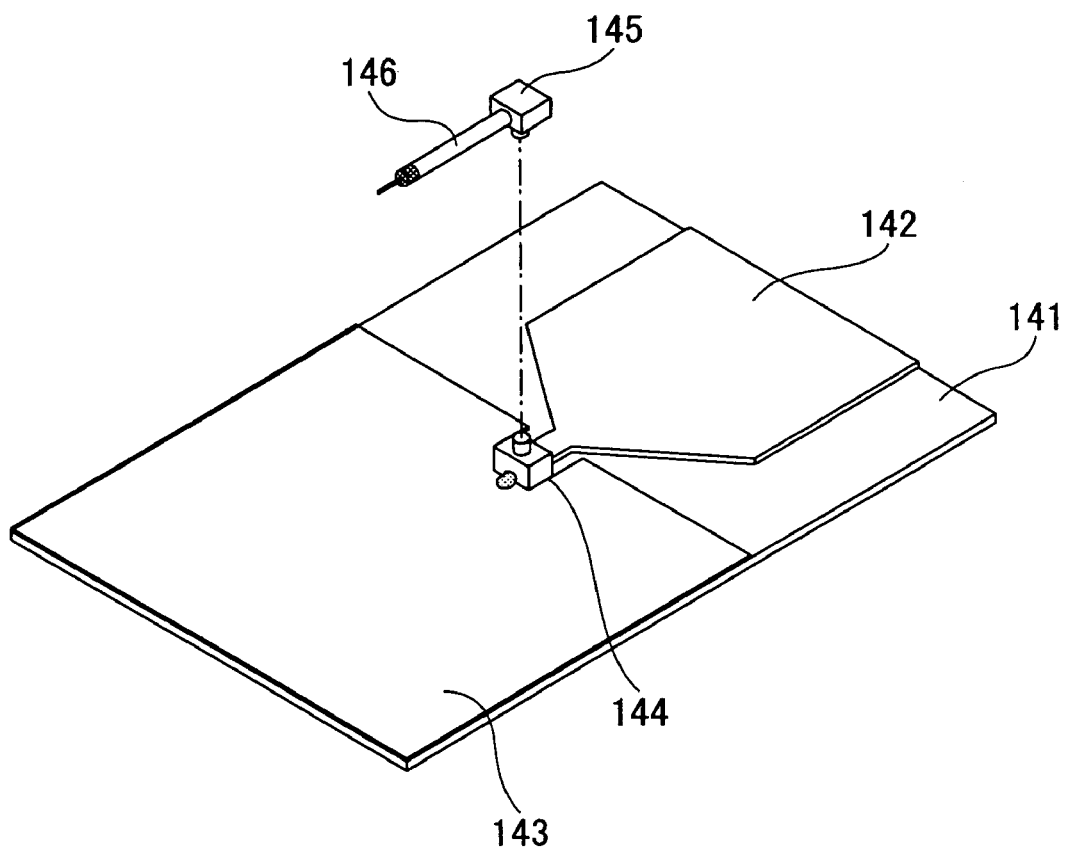
FIG. 4 is a perspective view illustrating a UWB antenna unit.

FIG. 4 is a perspective view illustrating the UWB antenna unit 131.

In the UWB antenna unit 131, an element pattern 142 and a ground pattern 143 are formed on a flexible printed wiring board 141; and a surface-mounted socket connector 144 is soldered to the element pattern 142 and the ground pattern 143. The UWB antenna unit 131 may be attached to the casing of the device main body 121. The surface-mounted socket connector 144 is connected to a plug connector 145. A coaxial cable 146 is connected at an end to the plug connector 145 and at the other end to the UWB communication IC chip 132.

The UWB antenna unit 131 sends and receives impulses. The UWB communication IC chip 132 generates an impulse waveform based on a signal from the processing unit 133, and restores the original signal from an impulse waveform received from the UWB antenna unit 131.

The processing unit 133 executes processing according to a terminal device control program. The display unit 134 includes a liquid crystal panel, for example, and displays information sent from the path management device 130 via the fixed communication device 120 under the control of the processing unit 133.

The touch panel 135 is disposed in front of the display screen of the display unit 134, and is operable by shoppers. The processing unit 133 executes processing based on operations on the touch panel 135.

The memory 136 includes a RAM and a ROM, in which the terminal device control program to be executed by the processing unit 133 is installed. The memory 136 is also used as a work area for the processing unit 133.

The barcode reader 137 reads a barcode attached to or printed on a product or the like, and sends the read barcode to the processing unit 133. The processing unit 133 communicates with the POS system 150 via the network 103 and performs processing such as billing according to the read barcode. Thus, payment is made during shopping, thereby eliminating the need to pay at the cash register.

The battery 122 is mounted on the base 111 and supplies power to the device main body 121. The generator 123 generates electric power through rotation of the wheels 113 during travel of the cart 101. The electric power generated by the generator 123 is supplied to the battery 122. The battery 122 is charged with the electric power supplied from the generator 123.

The configuration of the fixed communication device 120 is described below.

Figure 5:
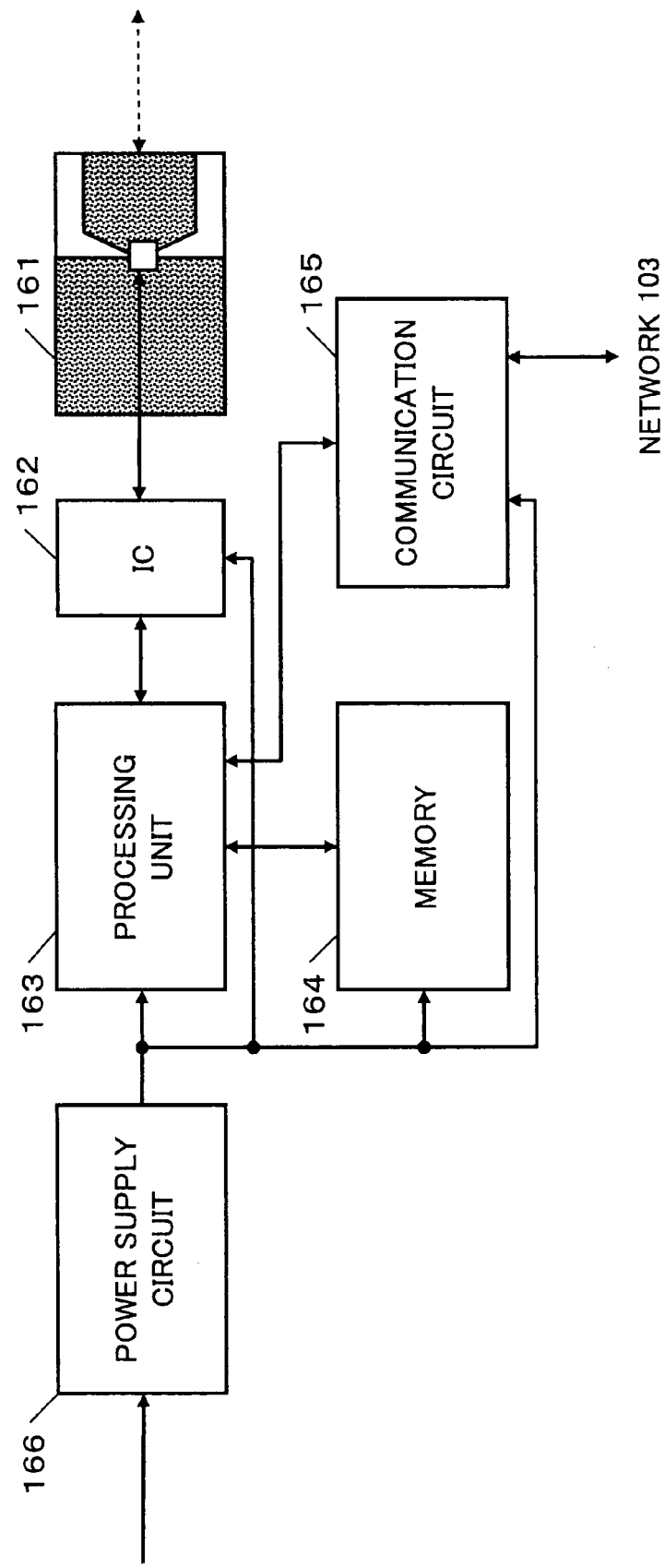
FIG. 5 is a block diagram illustrating a configuration of a fixed communication device.

FIG. 5 is a block diagram illustrating the configuration of the fixed communication device 120.

The fixed communication device 120 may be fixed to a rack 102 in a shop, and comprises a UWB antenna unit 161, a UWB communication IC chip 162, a processing unit 163, a memory 164, a communication circuit 165, and a power supply circuit 166.

The UWB antenna 161 has a similar configuration as the UWB antenna unit 131 of FIG. 4, and is configured to send and receive data based on UWB wireless communications.

The UWB communication IC chip 162 performs similar operations as the UWB communication IC chip 132. More specifically, the UWB communication IC chip 162 generates an impulse waveform based on a signal from the processing unit 163, and restores the original signal from an impulse waveform received by the UWB antenna unit 161.

The processing unit 163 executes processing according to a fixed communication device control program installed in the memory 164.

The memory 164 includes a RAM and a ROM, in which the fixed communication device control program to be executed by the processing unit 163 is installed. The memory 164 is also used as a work area for the processing unit 163. The communication circuit 165 controls communications with the network 103 so as to communicate with the path management device 130 and the security device 140.

The power supply circuit 166 is connected to an AC power source, and is configured to convert AC power to DC power so as to generate drive power for driving the UWB communication IC chip 162, the processing unit 163, the memory 164, the communication circuit 165, etc.

The configuration of the path management device 130 is described below.

Figure 6:
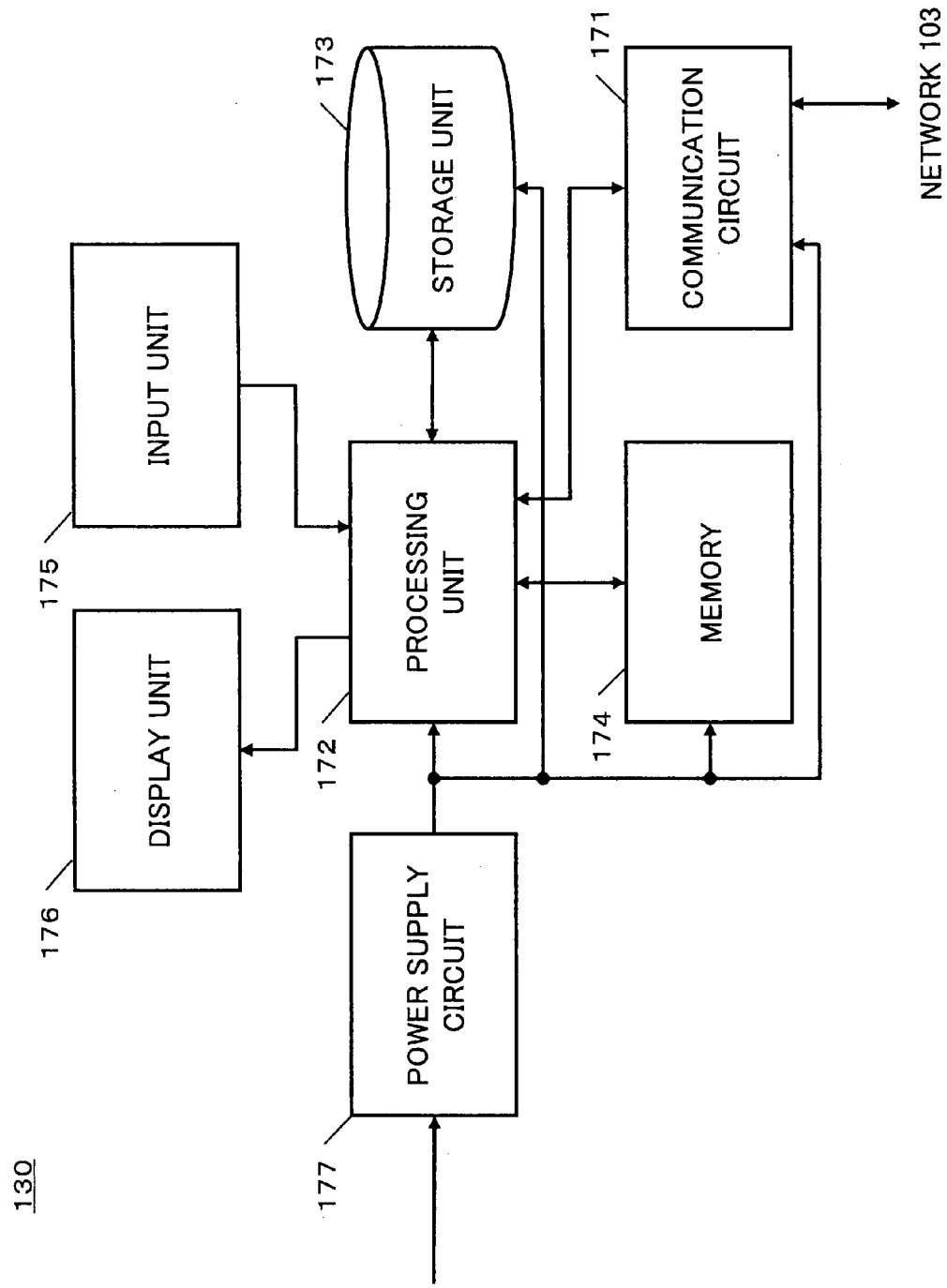
FIG. 6 is a block diagram illustrating a configuration of a path management device.

FIG. 6 is a block diagram illustrating the configuration of the path management device 130.

The path management device 130 includes a computer system comprising a communication circuit 171, a processing unit 172, a storage unit 173, a memory 174, an input unit 175, a display unit 176, and a power supply circuit 177.

The communication circuit 171 controls communications with the network 103 so as to communicate with the fixed communication device 120 and the security device 140.

The processing unit 172 executes processing according to a path management program installed in the storage unit 173.

The storage unit 173 includes a hard disk unit in which the path management program is installed. The storage unit 173 stores position information and stop time calculated based on the response time of the terminal device 110, which is reported from the fixed communication device 120 according to the path management program, in a manner associated with products arranged along the travel path and the stop position of the terminal device 110, and thereby builds a database for managing purchase behavior. A shopper may be identified by entry of his/her customer ID or the like into the terminal device 110 or by insertion of his/her customer card, which makes it possible to create the database of purchase behavior on a per shopper basis, thereby to provide different information to each shopper.

The memory 174 includes a RAM and a ROM, and is used as a work area for the processing unit 172.

The input unit 175 includes a keyboard and a mouse, and is used for command generation, data entry, etc.

The display unit 176 includes a CRT and an LCD, and is configured to display a graphic screen provided from the processing unit 172.

The power supply circuit 177 is connected to an AC power source, and is configured to convert AC power to DC power so as to generate drive power for driving the communication circuit 171, the processing unit 172, the storage unit 173, the memory 174, etc.

Figure 7:
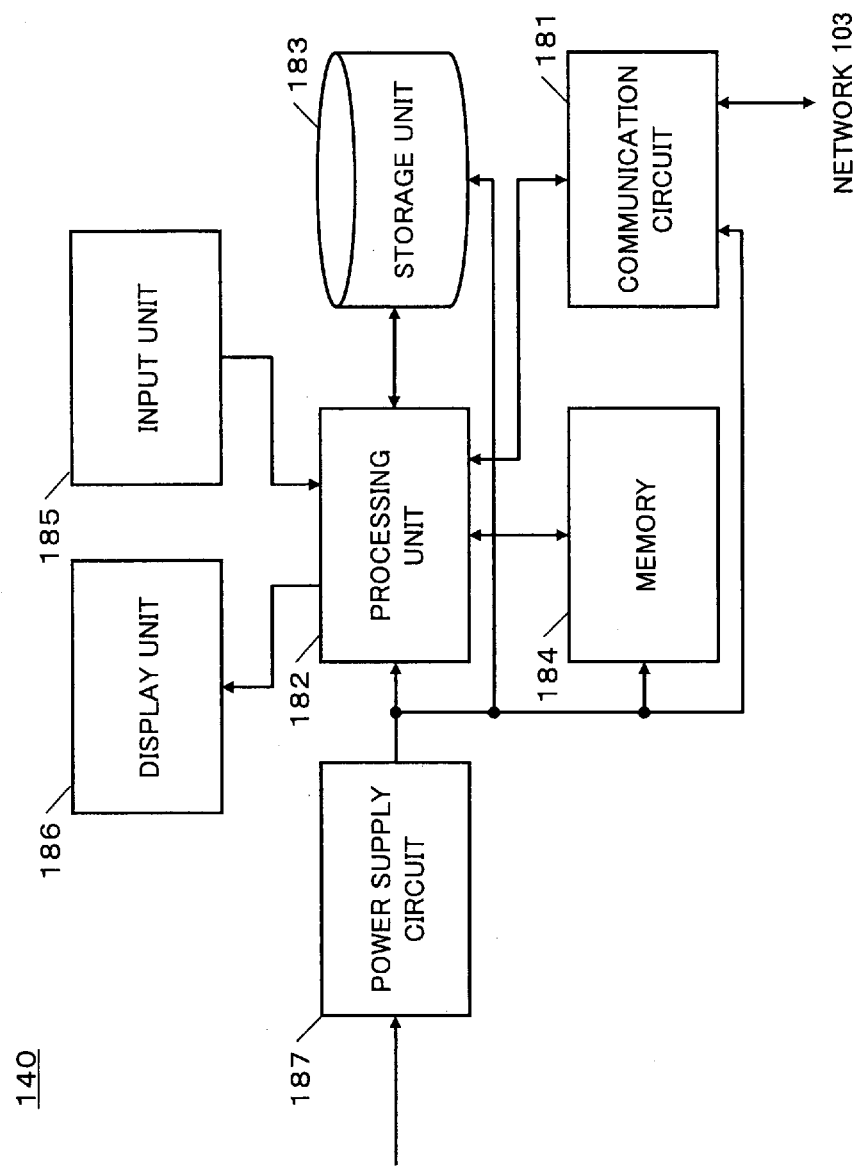
FIG. 7 is a block diagram illustrating a configuration of a security device.

FIG. 7 is a block diagram illustrating the configuration of the security device 140.

The security device 140 includes a computer system comprising a communication circuit 181, a processing unit 182, a storage unit 183, a memory 184, an input unit 185, a display unit 186, and a power supply circuit 187.

The communication circuit 181 controls communications with the network 103 so as to communicate with the fixed communication device 120 and the path management device 130.

The processing unit 182 executes processing according to a security program installed in the storage unit 183.

The storage unit 183 includes a hard disk unit, in which the security program is installed.

The memory 184 includes a RAM and a ROM, and is used as a work area for the processing unit 182.

The input unit 185 includes a keyboard and a mouse, and is used for command generation, data entry, etc.

The display unit 186 includes a CRT or an LCD, and is configured to display a graphic screen provided from the processing unit 182.

The power supply circuit 187 is connected to an AC power source, and is configured to convert AC power to DC power so as to generate drive power for driving the communication circuit 181, the processing unit 182, the storage unit 183, the memory 184, etc.

The processing by the shopping path tracking system 100 is described below.

Figure 8:
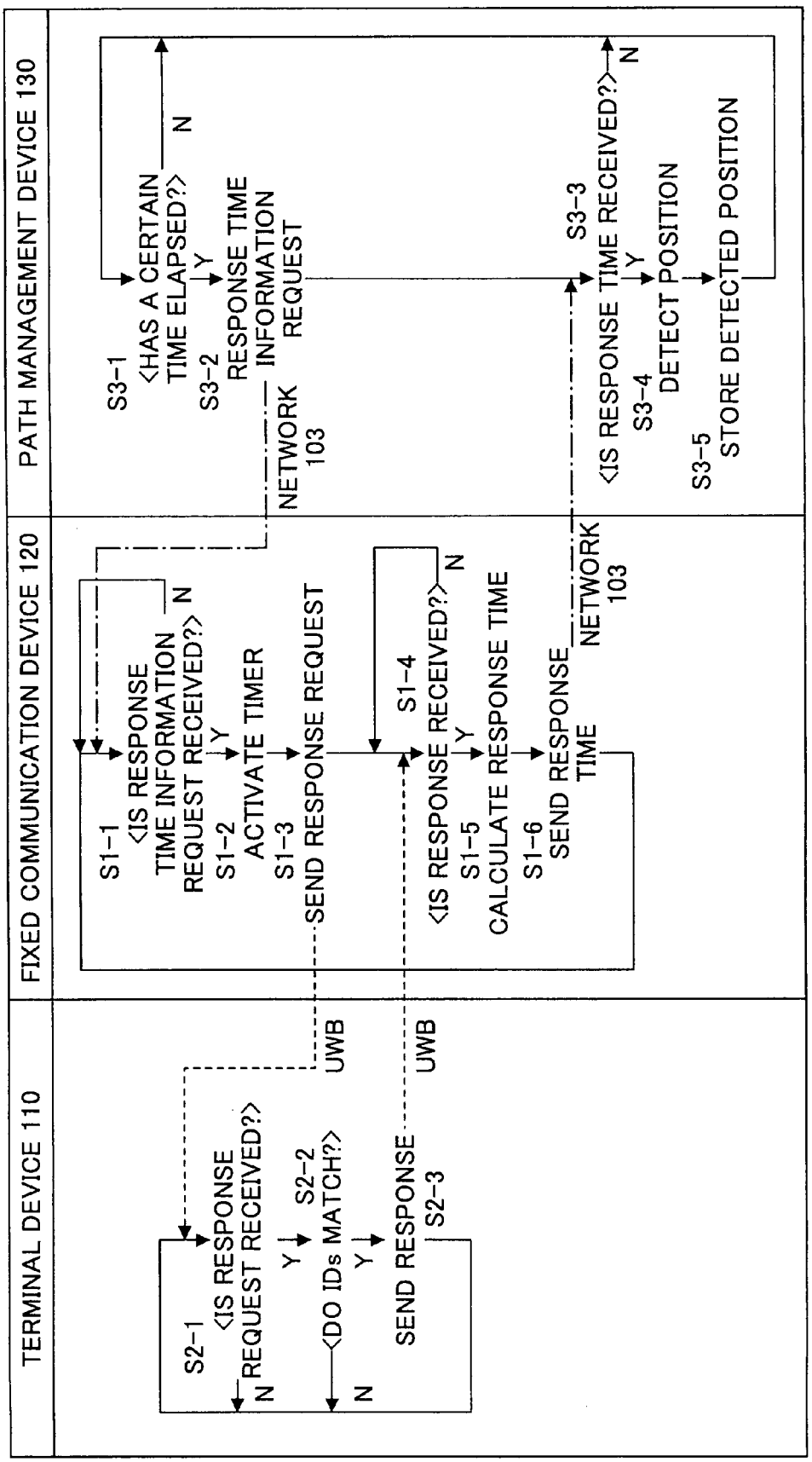
FIG. 8 is a flowchart illustrating processing by a shopping path tracking system.

FIG. 8 is a flowchart illustrating processing by the shopping path tracking system 100.

The path management device 130 sends a response time information request to the fixed communication device 120 via the network 103 at regular time intervals in Steps S3-1 and S3-2, and waits for response time information from the fixed communication device 120 in Step S3-3. The response time information request contains identification information of the terminal device 110 whose position is to be detected.

If the fixed communication device 120 receives the response time information request from the path management device 130 in Step S1-1, the fixed communication device 120 activates a built-in timer in Step S1-2, sends a response request based on the UWB communication by operating the UWB antenna unit 161 and the UWB communication IC chip 162 in Step S1-3, and waits for a response from the terminal device 110 in Step S1-4. The response request contains identification information of the terminal device 110 a response from which is requested.

If the terminal device 110 receives the response request from the fixed communication device in Step S2-1, the terminal device 110 determines whether the identification information contained in the response request matches that assigned in step S2-2. If, in Step S2-2, the identification information contained in the response request matches that assigned, then in Step S2-3, the terminal device 110 sends a response by operating the UWB antenna unit 131 and the UWB communication IC chip 132. The use of UWB enables accurate measurement of the response time, thereby enabling accurate detection of the position of the terminal device 110.

If, in Step S1-4, the fixed communication device 120 receives the response from the terminal device 110, then in Step S1-5, the fixed communication device 120 calculates response time by referring to the time measured by the built-in timer. In Step S1-6, the fixed communication device 120 sends, to the path management device 130 via the network 103, response time information containing the calculated response time and the identification information of the terminal device 110 that has responded to the response request.

If, in Step S3-3, the path management device 130 receives the response time information, then in step S3-4, the path management device 130 detects the position of the terminal device 110 based on the response time information.

Figure 9:
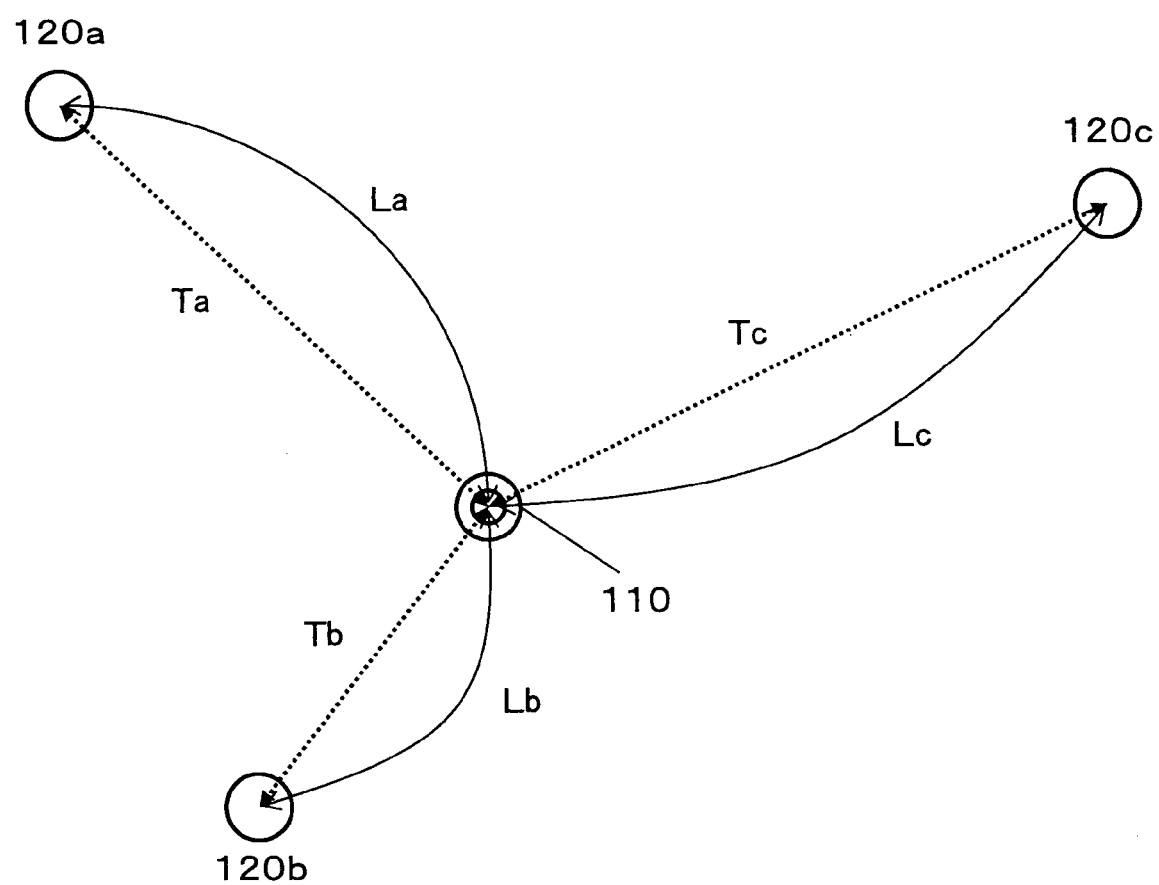
FIG. 9 is a diagram used to describe a method of detecting the position of a terminal device.

FIG. 9 is a diagram used to describe a method of detecting the position of the terminal device 110.

In this example, three fixed communications devices 120a, 120b, and 120c receive a response from a single terminal device 110, and detect response times Ta, Tb, and Tc, respectively. The response time Ta corresponds a distance La between the fixed communication device 120a and the terminal device 110; the response time Tb corresponds a distance Lb between the fixed communication device 120b and the terminal device 110; and the response time Tc corresponds a distance Lc between the fixed communication device 120c and the terminal device 110.

That is, the distances La, Lb, and Lc between the terminal device 110 and the fixed communication devices 120a, 120b, and 120c are calculated by detecting the response times Ta, Tb, and Tc, respectively. Since the fixed communication devices 120a, 120b, and 120c are fixed and therefore their positions (the coordinates) are determined, it is possible to identify the position (coordinates) of the terminal device 110 based on the distances La, Lb and Lc. In order to register the position (coordinates) of the fixed communication device 120 into the path management device 130, the fixed communication device 120 may include a position detection unit using GPS technology or the like. The position of the fixed communication device 120 detected by the position detection unit is reported to and registered into the path management device 130.

The path management device 130 stores the position information of the terminal device 110 detected in Step S3-4 into the storage unit 173 in Step S3-5.

Figure 11:
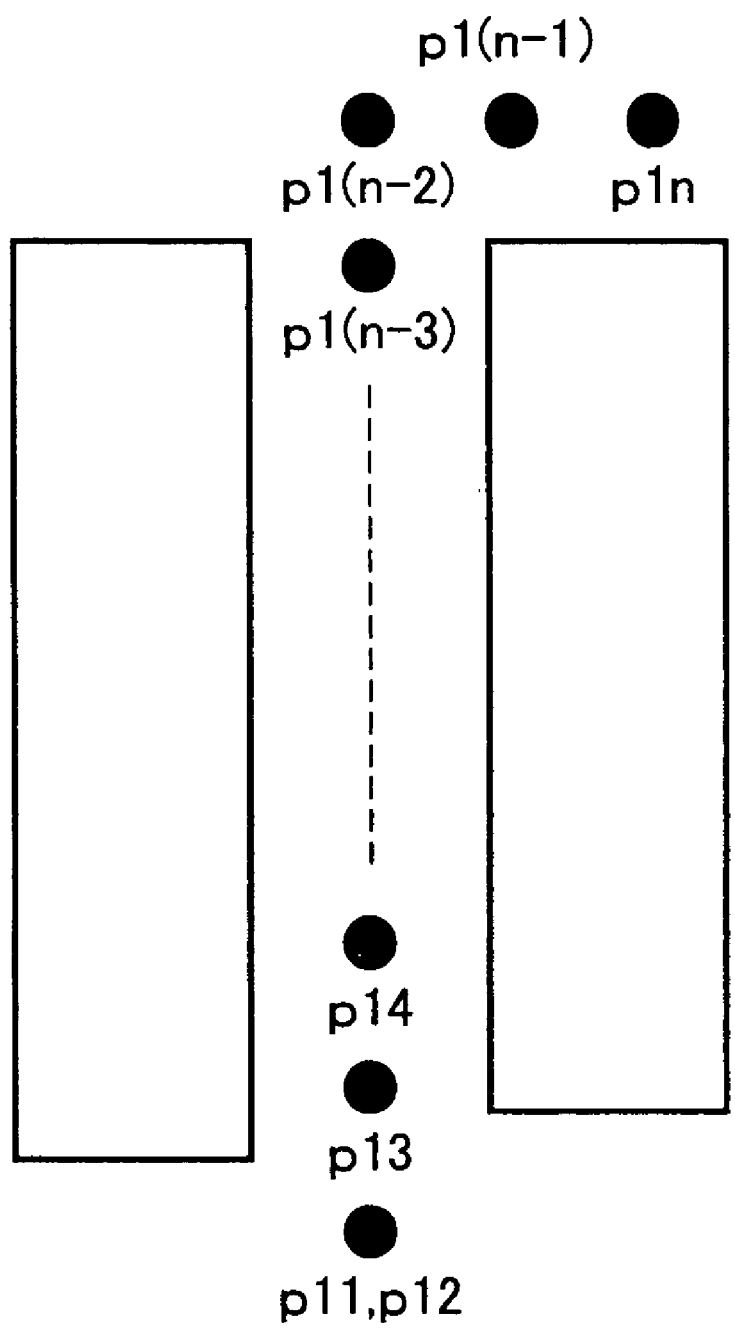
FIG. 11 is a diagram used to describe a travel path of a terminal device.

FIG. 10 is a diagram illustrating a data structure of the position information storage area in the storage unit 173. FIG. 11 is a diagram used to describe the travel path of the terminal device 110.

The position information storage area includes identification information, time, position information items, stop time, weather, etc. Referring to FIG. 11, the path of the terminal device 110 can be detected by tracing the position information items p11, p12, p13 . . . p1(n−2), and p1n that are stored in the storage unit 173. Further, a stop time T11 can be detected based on the position information items p11 through p1n and times t11 through t1n.

The information provision processing using the position information of the terminal device 110 is described below.

Figure 12:
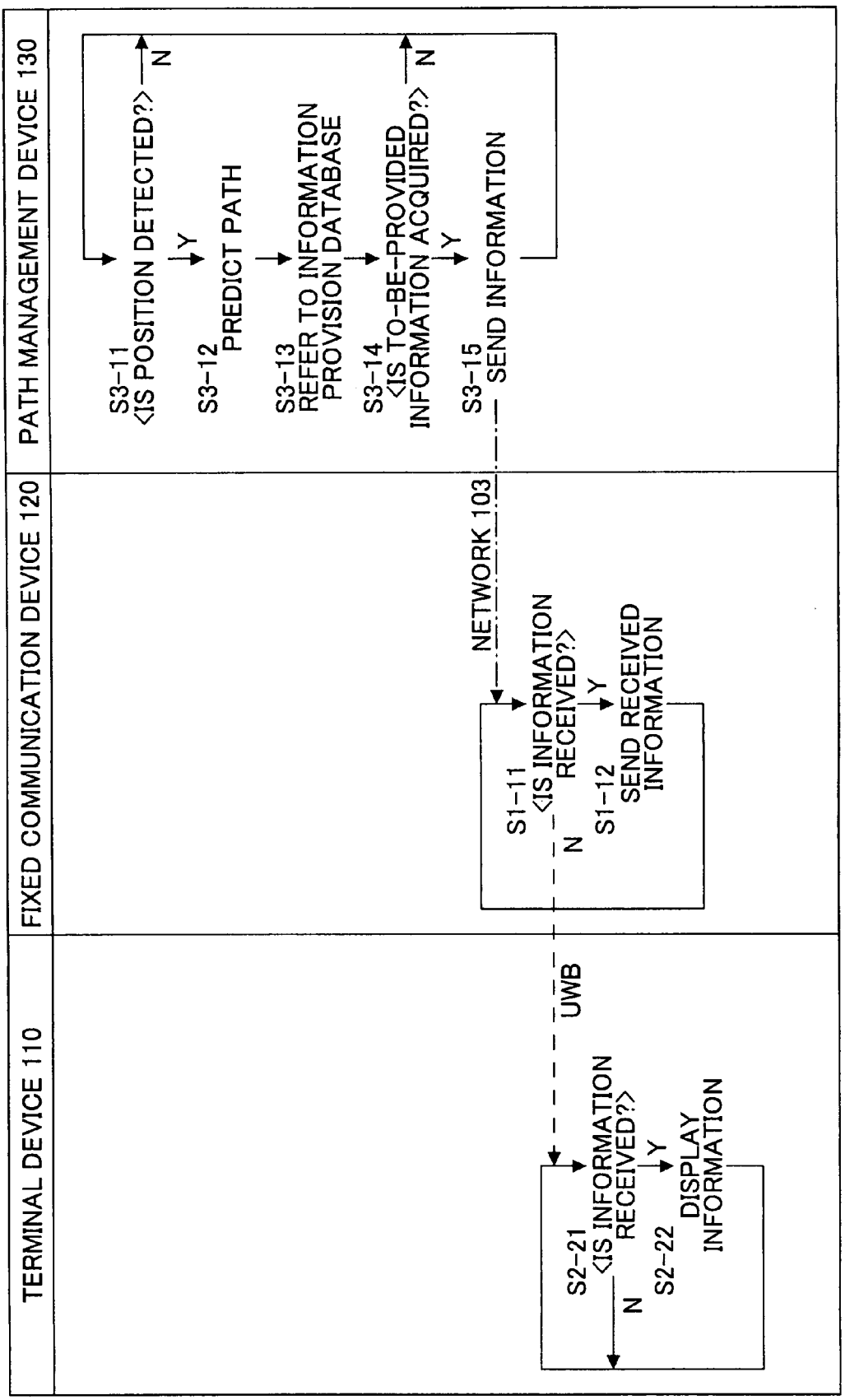
FIG. 12 is a flowchart illustrating information provision processing.

FIG. 12 is a flowchart illustrating the information provision processing.

It the path management device 130 detects the position of the terminal device 110 in Step S3-11, then in Step S3-12, the path management device 130 predicts a path that will be taken by the terminal device 110 based on its current and past positions. In Step S3-13, the path management device 130 refers to the information provision database stored in the storage unit 173 based on the predicted path.

FIG. 13 is a diagram illustrating a data structure of an information provision database.

The information provision database stores position information items p1 through pj and corresponding information items D1 through Dj to be provided. The information items D1 through Dj to be provided may include product advertisement, discount information, product information, shop information, for example. The path management device 130 predicts, based on the position and the path of the terminal device 110, a position for which the terminal device 110 is heading, refers to the information provision database based on the predicted position, and acquires the corresponding information item.

If, in Step S3-14, the path management device 130 acquires the corresponding information item, then in Step S3-15, the path management device 130 sends the acquired information item to the fixed communication device 120.

If, in Step S1-11, the fixed communication device 120 receives the information item from the path management device 130, then in Step S1-12, the fixed communication device 120 sends the received information item to the terminal device 110.

If in Step S2-21 the terminal device 110 receives the information item from the fixed communication device 120, then in Step S2-22 the terminal device 110 displays the received information item on the display unit 134.

FIG. 14 shows an example of an information display screen displayed on the display unit 134. In FIG. 14, (A) shows a menu display screen and (B) shows a detailed information display screen.

The terminal device 110 receives from the path management device 130 an information item corresponding to the position of the terminal device 110, and displays a menu display screen as shown in (A) of FIG. 14.

When a shopper touches an indication of a cabbage on the menu display screen, the touch panel 135 detects this operation and displays the detailed information of the cabbage as shown in (B) of FIG. 14.

In this way, the display unit 134 of the terminal device 110 shows information about products, shops, etc., so that the shopper can easily find and purchase low-price products or desired products with the help of the product and shop information displayed on the display unit 134. In addition, providing different shoppers with different suitable product information can encourage the shoppers to buy products.

The alarm processing is described below.

Figure 15:
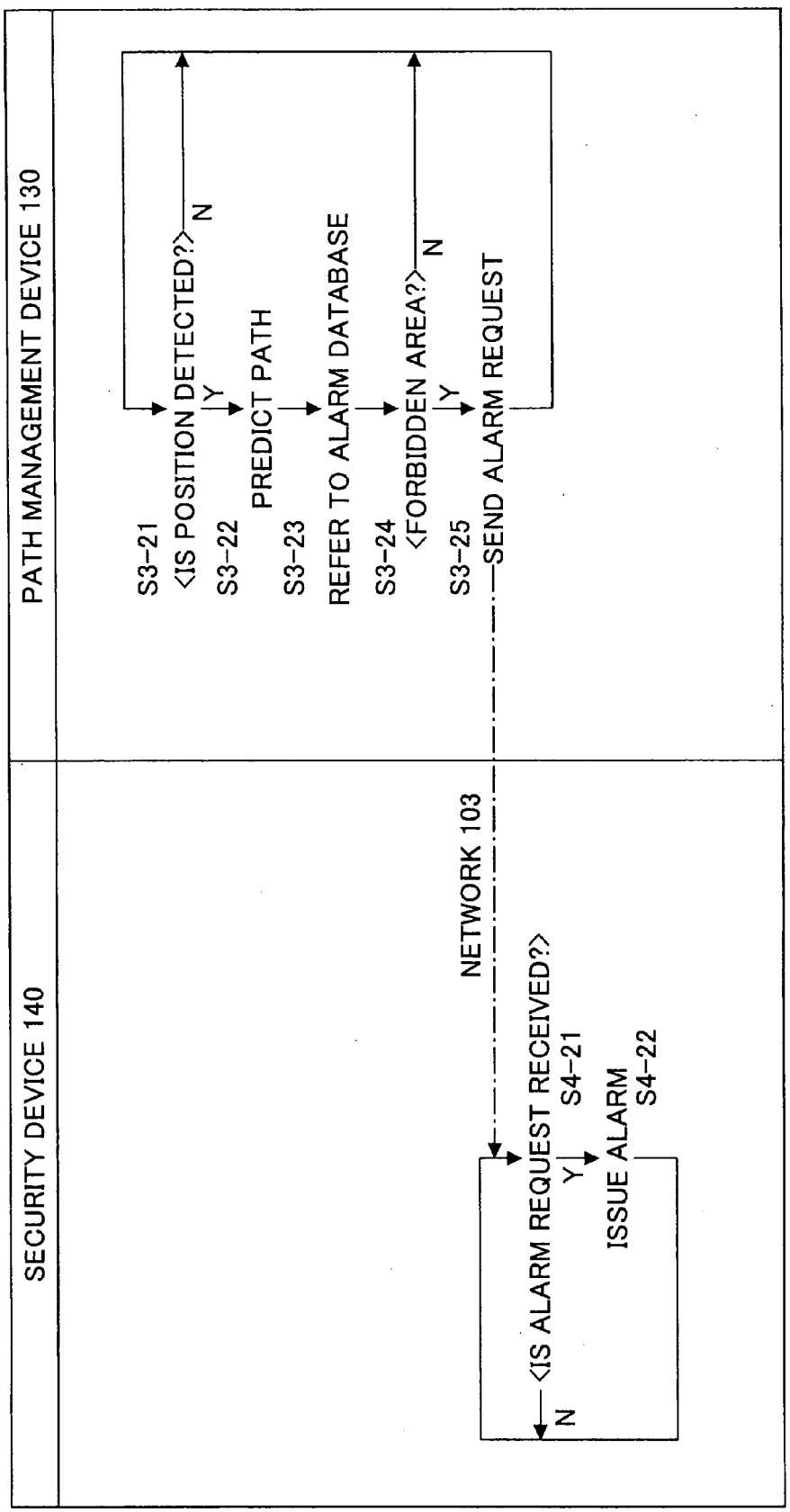
FIG. 15 is a flowchart illustrating alarm processing.

FIG. 15 is a flowchart illustrating the alarm processing.

If in Step S3-21 the path management device 130 detects the position of the terminal device 110, then in Step S3-22 the path management device 130 predicts a path that will be taken by the terminal device 110 based on its current and past positions. In Step S3-23, the path management device 130 refers to a database of alarm information stored in the storage unit 173 based on the path predicted.

The alarm database contains position information of forbidden areas in the shop.

The path management device 130 predicts, based on the position and the path of the terminal device 110, a position to which the terminal device 110 is directed, and refers to the alarm database based on the predicted position.

If in Step S3-24 the path management device 130 determines that the terminal device 110 is heading for a forbidden area based on the predicted position, then in Step S3-25 the path management device 130 sends an alarm request to the security device 140.

If in Step S4-21 the security device 140 receives the alarm request from the path management device 130, then in Step S4-22 the security device 140 issues an alarm to warn security staff or the like that a shopper is heading for a forbidden area.

As described above, in the present embodiment, the path management device 130 refers to the alarm database and sends an alarm request to the security device 140. In an alternative embodiment, the fixed communication device 120 may detect the approach of the terminal device 110 to the forbidden area and send an alarm request directly to the security device 140.

According to the present embodiment, the provision of the terminal device 110 capable of UWB wireless communications to the cart 101 allows specifying the position of the cart 101 at an accuracy of a few centimeters and thereby to accurately detect and record the path of a shopper. Since movement of shoppers can be thus identified, it is possible to lay out products according to the movement of shoppers.

Furthermore, it is possible to encourage shoppers to buy products by providing product information to the terminal device 110 based on the position and movement of the cart 101 with use of the UWB wireless communications.

In the present embodiment, the terminal device 110 communicates with the fixed communication device 120 so that the position of the terminal device 110 is detected based on the response time to the response request from the fixed communication device 120. In an alternative embodiment, tags with identification information may be provided on the wall or racks in the shop so that the terminal device 110 receives the identification information of the tags to detect its position and reports the position to the path management device 130 via the fixed communication device 120.

Second Embodiment

Figure 16:
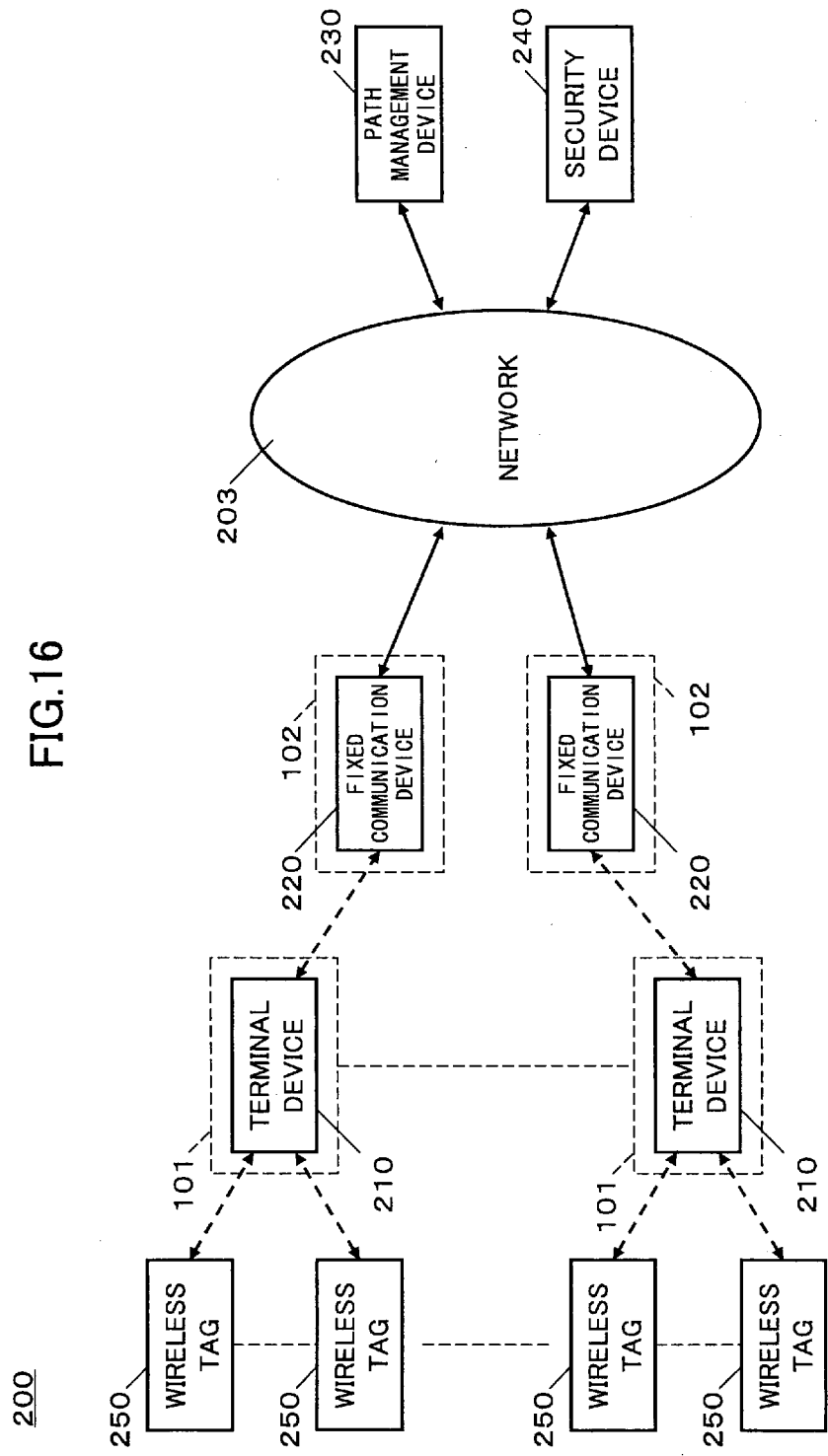
FIG. 16 is a system configuration diagram according to a second embodiment of the present invention.

FIG. 16 is a system configuration diagram according to a second embodiment of the present invention.

A shopping path tracking system 200 of this embodiment is configured to record a shopper path of a shopper through a shopping center and the like, and comprises terminal devices 210, fixed communication devices 220, a path management device 230, a security device 240, and wireless tags 250.

The terminal devices 210 can communicate with the wireless tags 250 and the fixed communication devices 220 using UWB (Ultra-Wideband) communications. The fixed communication devices 220 can communicate with the path management device 230 via a network 203 such as a LAN.

The fixed communication devices 220 have configurations similar to the fixed communication devices 120, but perform processing different from that executed by the fixed communication devices 120. The plural fixed communication devices 220 are provided in the shop, and are capable of data communications with the terminal devices 210. The terminal devices 210 have configurations similar to the terminal devices 110, but perform processing different from that executed by the terminal devices 110.

Each terminal device 210 sends a response request to the wireless tags 250 at regular time intervals. In response to the response request from the terminal device 210, the wireless tags 250 return responses to the terminal device 210. The terminal device 210 measures response time from each wireless tag 250 and reports to the path management device 230 via the fixed communication device 220 the response time from each wireless tag 250.

The path management device 230 has a configuration similar to the path management device 130, but performs processing different from the path management device 130. The path management device 230 has positional (coordinate) information of each wireless tag 250. The path management device 230 detects the position of the terminal device 210 based on the response time reported from plural of the fixed communication devices 220, detects a travel path of the terminal device 210 by tracking the detected position, and records the position and the travel path of the terminal device 210.

The path management device 230 calculates the time during which the terminal device 210 is stopped so as to detect travel behavior of the terminal device 210. The path management device 230 issues an alarm to the security device 240 according to the position and the travel path of the terminal device 210. The path management device 230 sends information corresponding to the position and the travel path of the terminal device 210 to the terminal device 210 based on the position and the travel path of the terminal device 210, and then the terminal device 210 displays the information sent from the path management device 230 on a display unit.

Figure 17:
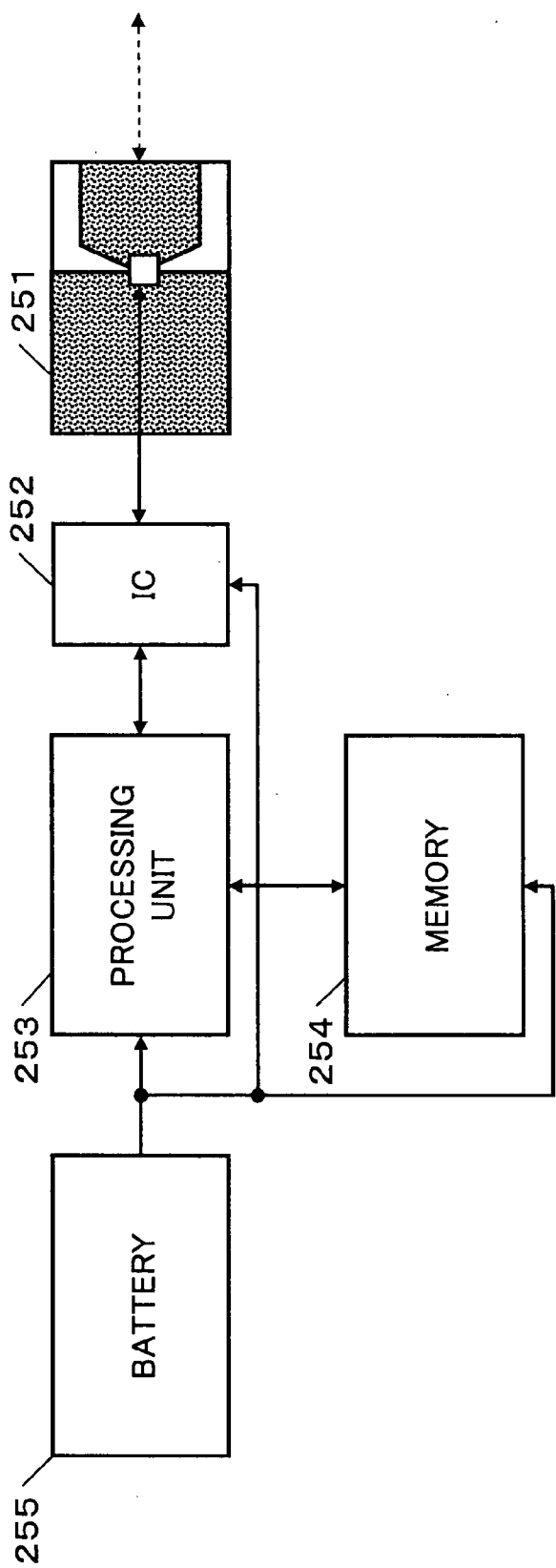
FIG. 17 is a block diagram illustrating a configuration of a wireless tag.

FIG. 17 is a block diagram illustrating the configuration of the wireless tag 250.

The wireless tags 250 are attached to the wall or product racks in a shop, and the attached positions (coordinates) of the wireless tags 250 are registered in the path management device 230.

The wireless tag 250 includes a UWB antenna unit 251, a UWB communication IC chip 252, a processing unit 253, a memory 254, and a battery 255.

The UWB antenna unit 251 has a configuration similar to the UWB antenna unit 131 of FIG. 4, and is configured to send and receive information based on UWB wireless communications.

The UWB communication IC chip 252 performs operations similar to the UWB communication IC chip 132. More specifically, the UWB communication IC chip 252 restores the original signal from a signal received by the UWB antenna unit 251, generates an impulse waveform based on a signal sent from the processing unit 253, and sends the impulse waveform to the UWB antenna unit 251.

The processing unit 253 reads out an identification number uniquely assigned to the wireless tag 250 from the memory 254 in response to a response request from the UWB communication IC chip 252, generates a response signal containing the identification number, and sends the response signal to the UWB communication IC chip 252.

The memory 254 includes a RAM and a ROM, and stores the identification number uniquely assigned to the wireless tag 250, which is read out in response to an instruction from the processing unit 253.

The battery 255 generates and supplies power to drive the UWB communication IC chip 252, the processing unit 253, and the memory 254.

The processing by the shopping path tracking system 200 of this embodiment is described below.

Figure 18:
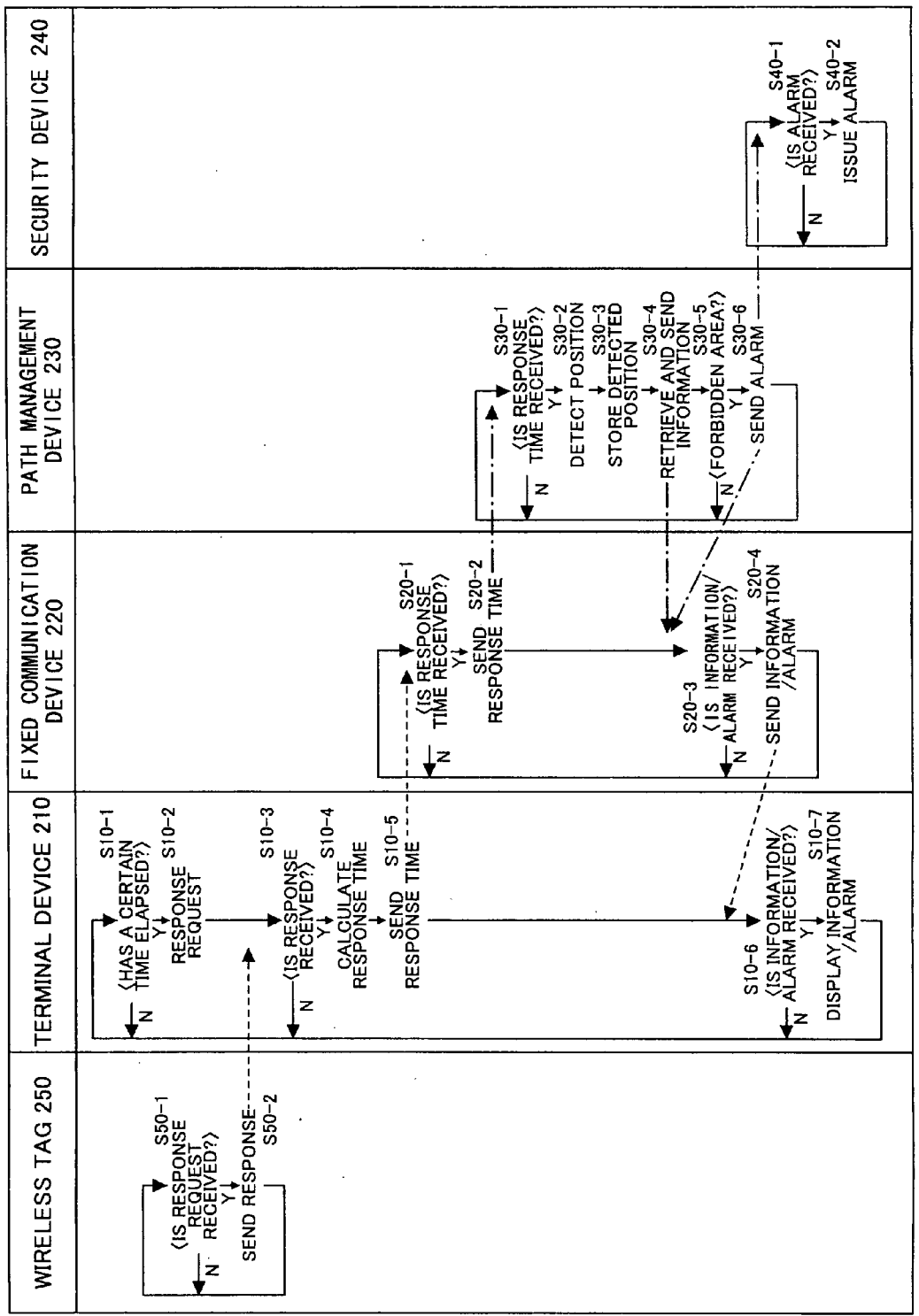
FIG. 18 is a flowchart illustrating processing by a shopping path tracking system.

FIG. 18 is a flowchart illustrating processing by the shopping path tracking system 200.

The terminal device 210 sends a response request using UWB communications in Step S10-1 and S10-2.

If in Step S50-1 the wireless tag 250 receives the response request, then in Step S50-2 the wireless tab 250 reads out the identification number from the memory 254 and returns a response containing the identification number.

If in Step S10-3 the terminal device 210 receives the response from the wireless tag 250, then in Step S10-4 the terminal device 210 calculates the response time from transmission of the response request to receipt of the response from the wireless tag 250. In Step S10-5 the terminal device 210 sends the response time with the identification number of the wireless tag 250 and the identification number of the terminal device 210 to the fixed communication device 220 using UWB communications.

If in Step S20-1 the fixed communication device 220 receives the response time from the terminal device 210, then in Step S20-2 the fixed communication device 220 transmits the response time to the path management device 230.

If in Step S30-1 the path management device 230 receives the response time from the fixed communication device 220, then the path management device 230 detects the position of the terminal device 210 based on the identification number of the wireless tag 250 and the response time in the same manner as illustrated in FIG. 8 in Step S30-2, and stores the detected position in Step S30-3. Storing sequentially the detected positions enables identifying the travel path of the terminal device 210 in the same manner as the first embodiment.

In Step S30-4 the path management device 230 retrieves information corresponding to the detected position and sends it to the fixed communication device 220. In Step S30-5, the path management device 230 determines whether the terminal device 210 is going to enter a forbidden area based on the path of the terminal device 210. If in Step S30-5 the path management device 230 determines that the terminal device 210 is going to enter a forbidden area, then in Step S30-6 the path management device 230 sends information indicative of the possible entry of the terminal device 210 into a forbidden area or an alarm to the fixed communication device 220 and the security device 240.

If in Step S20-3 the fixed communication device 220 receives the information or the alarm from the path management device 230, then in Step S20-4 the fixed communication device 220 transmits the information or the alarm to the terminal device 210.

If in Step S10-6 the terminal device 210 receives the information or the alarm from the fixed communication device 220, then in Step S10-7 the terminal device 210 displays on the display unit 134 the information or an indication indicating that the terminal device 210 is heading for a forbidden area. The information or the alarm may be provided in the form of audio.

If in Step S40-1 the security device 240 receives the alarm from the path management device 230, then in Step S40-2 the security device 40-2 issues an alarm. In response to the alarm from the security device 240, security staff or store staff may warn a shopper who is going to enter the forbidden area.

In this way the path of the terminal device 210 can be managed, which enables providing shoppers with the information or warning against entry into a forbidden area.

In the first and second embodiments, the terminal devices 110 and 210 display the information or the alarm on the display units. In an alternative embodiment, a mobile phone equipped with a UWB antenna unit and a UWB communication IC communicate with the terminal devices 110 and 210 using UWB communications, and display information provided from the fixed communication devices 120 and 220 or an alarm on the display screen of the mobile phone. In the first and the second embodiments, the touch panels are used for changing information displayed by the terminal devices 110 and 210. In an alternative embodiment, the terminal devices 110 and 210 may be operated by an input unit of a mobile phone through UWB wireless communications.

In place of the terminal devices 110 and 210, a mobile phone carried by a shopper may be used. In this case, the mobile phone is provided with a UWB antenna unit and a UWB communication IC chip. In addition, for performing the same function as the terminal device 110, the mobile phone has a program installed that provides the same functions in the mobile phone as the terminal device control program installed in the terminal device. The program may be installed upon entry to a shop. Thus, the mobile phone provides the same functions as the terminal devices 110 and 210.

The cart 101 may be fitted with a charging holder for charging the mobile phone. When in the mobile phone is placed in the charging holder, the mobile phone can offer the same functions as the terminal device 110 while being charged.

In this way, mobile phones that shoppers usually use can be employed as devices for displaying product and shop information.

In an embodiment, the cart 101 may include a reed switch, and a magnet may be provided in a cart parking space. When the cart 101 is placed in the cart parking space, the reed switch is turned off by the magnetic force of the magnet, so that the battery 122 is disconnected from the device main body 121. Thus, the terminal device 110 stops its operations. When the cart is moved away from the cart parking space to be out of the effect of the magnetic force of the magnet disposed in the cart parking lot, the reed switch is turned on, so that the battery 122 supplies electric power to the device main body 121 to drive the terminal device 110.

The terminal device may include a card reader. In response to insertion of a reward card or the like of a shopper into the card reader, the battery 122 is connected to the device main body 121, so that the terminal device 110 is activated to execute path management and provide information. The card reader may read customer identification information from the reward card and send as identification information of the terminal device 110 the read customer information to the path management device 130 via the fixed communication device 120, thereby managing the path based on the customer identification information. Since paths can be managed on a per customer basis in this way, it is possible to provide information based on the path of each customer.

While the present invention is described in terms of preferred embodiments, it will be apparent to those skilled in the art that variations and modifications may be made without departing from the scope of the invention.

The present application is based on Japanese Priority Application No. 2007-049505 filed on Feb. 28, 2007, with the Japanese Patent Office, the entire contents of which are hereby incorporated by reference.

What is claimed is:

1. A shopping path tracking system, comprising:
    a terminal device;
    a fixed communication device; and
    a path management device;
    wherein the fixed communication device wirelessly communicates with the terminal device, calculates a response time of the terminal device based on a response request sent from the fixed communication device to the terminal device, and reports the calculated response time to the path management device; and
    the path management device detects a position of the terminal device based on the response time reported from the fixed communication device, stores the detected position, and detects a travel path of the terminal device by tracking a plurality of the stored positions.

2. The shopping path tracking system as claimed in claim 1, wherein the path management device calculates a time during which the terminal device is not moving.

3. The shopping path tracking system as claimed in claim 1, wherein the path management device sends an alarm to a security device depending on the position of the terminal device.

4. The shopping path tracking system as claimed in claim 1, wherein the path management device sends to the terminal device an information item corresponding to the position and the travel path of the terminal device based on the position and the travel path of the terminal device; and the terminal device displays the information item on a display unit.

5. The shopping path tracking system as claimed in claim 1, wherein the terminal device communicates with the fixed communication device using Ultra Wideband communications.

6. The shopping path tracking system as claimed in claim 1, wherein the path management device builds a database by storing the travel path of the terminal device, one or more stop positions of the terminal device, and an identification of products arranged along the travel path, and in the one or more stop positions of the terminal device.

7. A shopping path tracking system, comprising:
a wireless tag;
a terminal device;
a fixed communication device; and
a path management device;
wherein the terminal device communicates with the wireless tag, calculates a response time of the wireless tag based on a response request sent from the fixed communication device to the wireless tag, and sends the calculated response time to the fixed communication device;
the fixed communication device reports to the path management device the response time sent from the terminal device; and
the path management device detects a position of the terminal device based on the reported response time, stores the detected position, and detects a travel path of the terminal device by tracking a plurality of the stored positions.

8. The shopping path tracking system as claimed in claim 7, wherein the path management device calculates a time during which the terminal device is not moving.

9. The shopping path tracking system as claimed in claim 7, wherein the path management device sends an alarm to a security device depending on the position of the terminal device.

10. The shopping path tracking system as claimed in claim 7,
wherein the path management device sends to the terminal device an information item corresponding to the position and the travel path of the terminal device based on the position and the travel path of the terminal device; and the terminal device displays the information item on a display unit.

11. The shopping path tracking system as claimed in claim 7,
the wireless tag communicates with the terminal device using Ultra Wideband communications; and
the terminal device communicates with the fixed communication device using Ultra Wideband communications.

12. The shopping path tracking system as claimed in claim 7, wherein the path management device detects the position of the terminal device based on the reported response time, stores the detected position, detects the travel path and one or more stop positions of the terminal device by tracking the stored position, and builds a database by storing the travel path, the one or more stop positions of the terminal device, and an identification of products arranged along the travel path and in the one or more stop positions of the travel path.

13. A terminal device that wirelessly communicates with a fixed communication device and communicates with a path management device via the fixed communication device, the terminal device comprising:
a communication unit;
a display unit; and
a processing unit;
wherein, in response to a response request from the fixed communication device, the processing unit causes the communication unit to send a response to the fixed communication device; and
the display unit displays an information item corresponding to a position from which the response is sent by the communication unit, the information item being sent from the path management device via the fixed communication device.

14. The terminal device as claimed in claim 13, wherein the communication unit communicates with the fixed communication device using Ultra Wideband communications.

15. A fixed communication device that communicates with a terminal device and a path management device, the fixed communication device comprising:
a wireless communication unit that wirelessly communicates with the terminal device;
a second communication unit that communicates with the path management device; and
a processing unit that causes the wireless communication unit to communicate with the terminal device, detects a response time from transmission of a response request from the wireless communication unit to reception of a response from the terminal device, causes the second communication unit to report the response time to the path management device, and sends to the terminal device an information item provided by the path management device based on the response time.

16. The fixed communication device as claimed in claim 15, wherein the wireless communication unit communicates with the terminal device using Ultra Wideband communications.

17. A path management device that communicates with a terminal device via a fixed communication device, the path management device comprising:
a communication unit that communicates with the fixed communication device;
a storage unit;
a processing unit that detects a position of the terminal device based on a response time of the terminal device responsive to a response request sent from the fixed communication device to the terminal device, the response time reported from the fixed communication device to the processing unit, wherein the processing unit sends to the terminal device via the fixed communication device an information item corresponding to the position of the terminal device, detects a travel path and a stop position of the terminal device based on a plurality of the positions of the terminal device, and stores the travel path and the stop position in the storage unit.

* * * * *